United States Patent [19]
Cooley

[11] 3,882,415
[45] May 6, 1975

[54] GLASS LASER DISCS WITH ANNULAR ALKALI LEAD BORATE COATINGS AND USES THEREOF

[75] Inventor: Richard F. Cooley, Toledo, Ohio

[73] Assignee: Owens-Illinois, Inc., Toledo, Ohio

[22] Filed: Feb. 13, 1973

[21] Appl. No.: 332,057

[52] U.S. Cl............................................. 331/94.5 E
[51] Int. Cl............................................. H01s 3/16
[58] Field of Search...................... 331/94.5; 330/4.3

[56] References Cited
UNITED STATES PATENTS

| | | | |
|---|---|---|---|
| 3,241,085 | 3/1966 | Marcatili | 331/94.5 |
| 3,621,456 | 11/1971 | Young | 331/94.5 |
| 3,675,152 | 7/1972 | Young | 331/94.5 |

*Primary Examiner*—William L. Sikes
*Attorney, Agent, or Firm*—Richard D. Heberling; E. J. Holler

[57] ABSTRACT

A laser assembly that includes a novel glass laser disc having an annular alkali lead borate glass coating for use in the assembly is disclosed. The annular coating has an index of refraction that is about 3 to 12 percent greater than the index of refraction of the laser disc, the thermal properties also being sufficiently matched with the glass laser disc so as to prevent the development of undesirable strains therein, the glass coating comprising a mixture of alkali metal oxides in which at least two different alkali metal oxides are present, and any $K_2O$ that is present is limited to an amount of not substantially more than about 1 percent by weight and an effective energy absorbing amount of heavy metal oxide that absorbs energy at a wavelength of about 1.06 microns to prevent parasitic oscillations. The heavy metal oxides include oxides of transition metals of the 3$d$, 4$d$, 4$f$, 5$d$ and 5$f$ orbital series.

17 Claims, 3 Drawing Figures

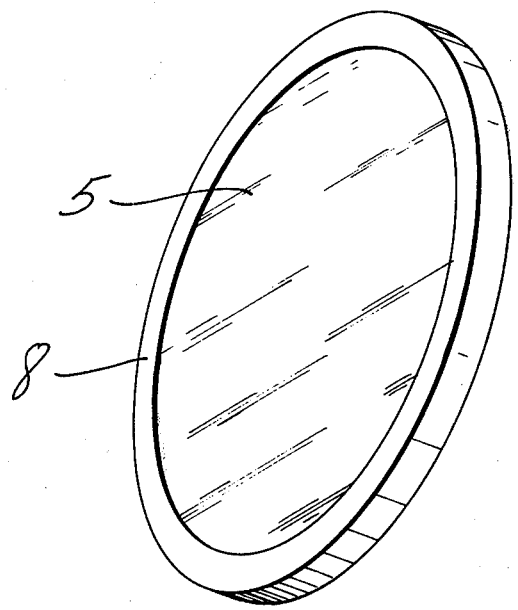
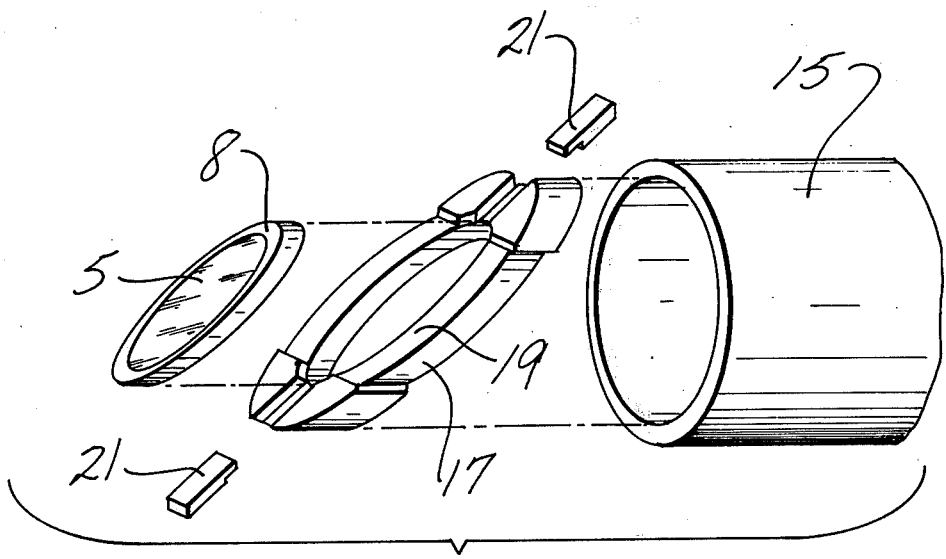

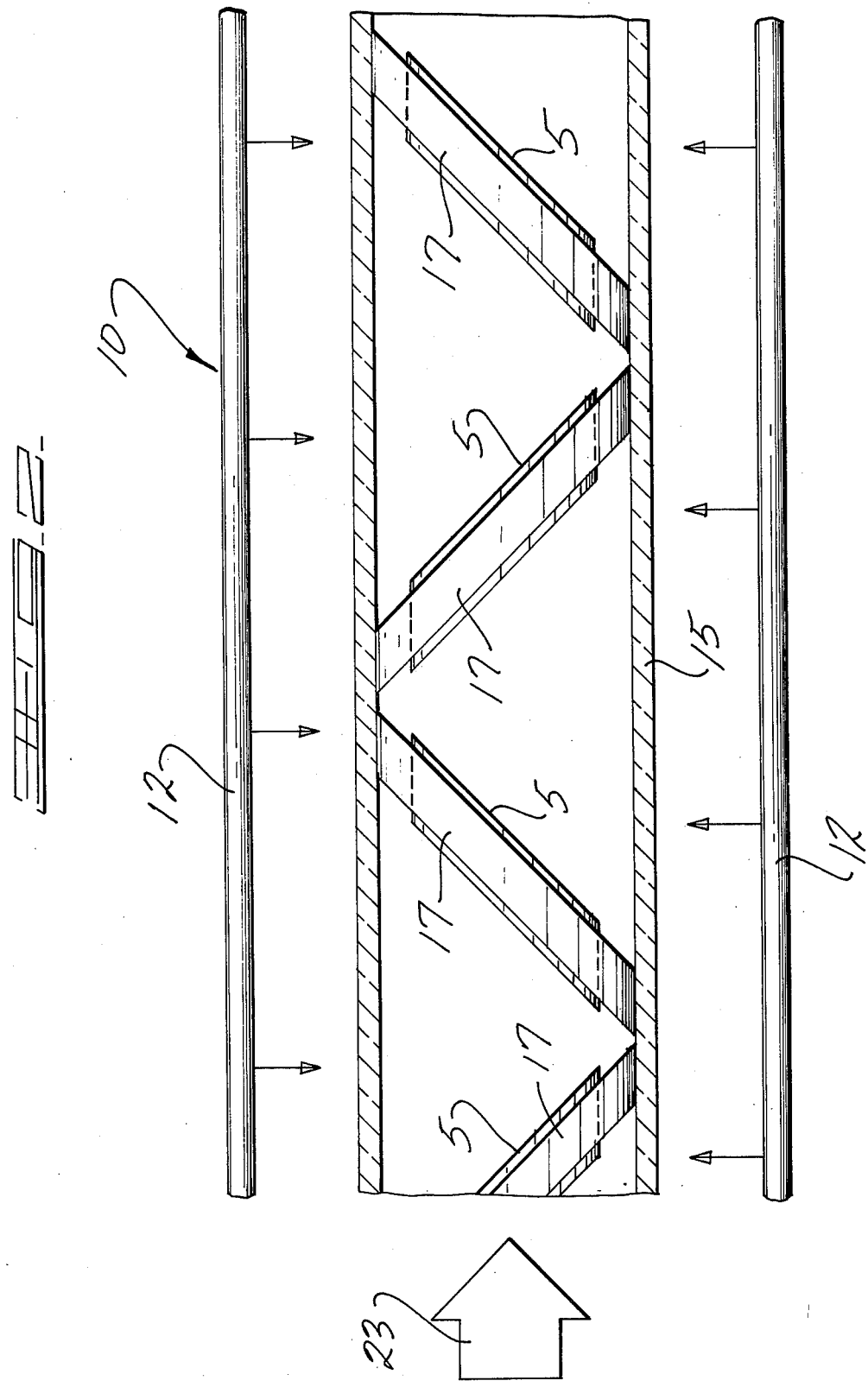

GLASS LASER DISCS WITH ANNULAR ALKALI LEAD BORATE COATINGS AND USES THEREOF

THE INVENTION

The present invention relates to a glass laser disc having an annular alkali lead borate glass coating capable of absorbing energy at a wavelength of about 1.06 microns. The present invention also is directed to a laser assembly including the glass laser disc. The present invention also relates to the new use of alkali lead borate glass coatings for glass laser discs in which the new use includes coating the disc around the periphery thereof with an alkali lead borate glass capable of absorbing energy at a wavelength of about 1.06 microns, pumping the laser disc to cause an energy inversion, and passing monochromatic light through the disc to cause stimulated emission and absorbing energy at a wavelength of 1.06 microns in the glass coating by means of an energy absorbing heavy metal oxide to thereby prevent parasitic oscillations.

It is an object of the present invention to provide a glass laser disc having an annular alkali lead borate glass capable of absorbing energy at a wavelength of 1.06 microns to thereby prevent parasitic oscillations, the glass coating having an index of refraction advantageously of no more than about 12 percent greater than the index of refraction of the laser disc, the thermal expansion and contraction of the coating being sufficiently compatible with the glass laser disc so as to prevent the development of undesirable strains in the disc, the glass coating comprising:

1. a mixture of alkali metal oxides in which at least two different alkali metal oxides are present, and any $K_2O$ that is present is limited to an amount of not substantially more than about 1 percent by weight; and
2. an effective energy absorbing amount of a heavy metal oxide that absorbs energy at a wavelength of about 1.06 microns, the heavy metal oxide including oxides of transition metals of the $3d$, $4d$, $4f$, $5d$ and $5f$ orbital series.

It is an object of the present invention to provide a laser assembly including means for providing a source of pumping light; means defining a cavity for lasing material including a housing; means for holding a glass laser disc in the housing; a source of monochromatic light; and at least one glass laser disc located within the housing for causing stimulated emission when the monochromatic light is passed therethrough, the disc having an annular alkali lead borate glass coating to prevent parasitic oscillations, the glass coating having an index of refraction of about 3 – 12 percent greater than the index of refraction of the laser disc, the thermal expansion and contraction of the coating being sufficiently compatible with the glass disc so as to prevent the development of undesirable strains in the disc, the glass coating comprising:

1. a mixture of alkali metal oxides in which at least two different alkali metal oxides are present, and any $K_2O$ that is present is limited to an amount of not substantially more than about 1 percent by weight; and
2. an effective energy absorbing amount of a heavy metal oxide that absorbs energy at a wavelength of about 1.06 microns.

It is an object of the present invention to provide the new use of a glass coating for a glass laser disc having an annular alkali lead borate glass coating, the new use comprising the steps of:

a. coating the glass laser disc with an alkali lead borate glass containing an effective energy absorbing amount of a heavy metal oxide that absorbs energy at a wavelength of about 1.06 microns to provide an annular coating on the disc, the glass coating including a mixture of alkali metal oxides in which at least two different alkali metal oxides are present and in which any $K_2O$ present is limited to an amount of not more than about 1 percent by weight;
b. pumping the disc to cause an energy inversion; and
c. passing monochromatic light through the disc to cause stimulated emission and absorbing energy at a wavelength of 1.06 microns in the annular glass coating to thereby prevent parasitic oscillations.

These and other objects will be apparent from the specification that follows, the appended claims, and the drawings in which:

FIG. 1 is a top plan view of a glass laser disc having an annular alkali lead borate glass coating;

FIG. 2 is a fragmentary elevated view of a laser assembly including a plurality of glass laser discs having annular lead borate glass coatings within the housing of the laser assembly; and FIG. 3 is a perspective exploded view of a glass laser disc having an annular alkali lead borate coating and of means for holding the disc within the laser assembly.

The present invention provides an outstanding glass laser disc having an annular alkali lead borate glass that is capable of absorbing energy at a wavelength of 1.06 microns to prevent parasitic oscillations, the outstanding glass coating having an index of a refraction closely matching that of the index of refraction of the laser disc and being no more than about 12 percent greater than the index of refraction of the disc, the thermal expansion and contraction of the coating being sufficiently compatible with the glass disc so as to prevent the development of undesirable strains in the disc when used to cause stimulated emission, the glass coating comprising:

1. a mixture of alkali metal oxides in which at least two different alkali metal oxides are present, and any $K_2O$ that is present is limited to an amount of not substantially more than about 1 percent by weight; and
2. an effective energy absorbing amount of a heavy metal oxide that absorbs energy at a wavelength of about 1.06 microns.

The present invention also provides an outstanding laser assembly that includes the novel glass laser disc having its outstanding annular alkali lead borate glass coating for use therein. The annular coating has an index of refraction that is about 3 – 12 percent greater than the index of refraction of the laser disc, the thermal expansion and contraction properties of the coating also being sufficiently matched with the glass laser disc so as to prevent the development of undesirable strains therein, the glass coating comprising a mixture of alkali metal oxides in which at least two different alkali metal oxides are present, and any $K_2O$ that is present is limited to an amount of not substantially more than about 1 percent by weight and to an effective energy absorbing amount of heavy metal oxides that absorbs energy at a wavelength of about 1.06 microns to prevent parasitic oscillations.

In solving the problem of closely matching the index of refraction of the coating with that of the disc and keeping the index of refraction of the coating only about 3 – 12 percent greater than that of the disc and also keeping the thermal expansion and contraction properties of the coating compatible with that of the disc, an effective index of refraction-matching amount of the mixture of alkali metal oxides is used with the proviso that the amount of $K_2O$ should not be more than about 1 percent by weight. Generally, the mixture of alkali metal oxides is used in an amount of about 1 – 20 percent by weight and preferably about 1 – 15 percent by weight with the optimum results being usually in the range of about 2 – 7 percent by weight.

The present invention also provides the new use of a glass coating or a glass laser disc, the new use comprising the steps of:

a. coating the glass laser disc with an alkali lead borate glass containing an effective energy absorbing amount of a heavy metal oxide that absorbs energy at a wavelength of about 1.06 microns to provide an annular coating on the disc, the glass also containing an effective index of refraction matching amount of a mixture of alkali metal oxides in which at least two different oxides are used and in which any $K_2O$ used is limited to an amount of not substantially more than about 1 percent by weight of the glass;

b. pumping the disc to cause an energy inversion; and c. passing monochromatic light through the disc to cause stimulated emission and at the same time absorbing energy at a wavelength of about 1.06 microns in the annular glass coating to thereby prevent parasitic oscillations within the disc.

As seen in the Figures, a glass laser disc 5 is provided, having an annular alkali lead borate glass coating 8 for absorbing energy at a wavelength of about 1.06 microns to absorb parasitic oscillations.

The undesirable effects of parasitic oscillations is described, for instance, in U.S. Pat. No. 3,508,165 to Nicolai. This patent is hereby incorporated by reference for its disclosure of the problem of parasitic oscillation or a depumping due to whispering modes in which a wave front is internally reflected several times along an internal path within the disc.

As for instance seen in FIG. 2, the laser assembly 10 is provided that includes flash tubes 12 that are a means for providing a source of pumping light. Also provided is means for defining a cavity within the flash tubes of the laser assembly including a substantially cylindrical housing 15. Also provided is means for holding each of the glass laser discs in the housing including a plurality of holding member 17 that are attached to the housing and adapted for holding the disc 5. Turning to the exploded view (FIG. 3) there is shown the disc 5 and the holder 17 in which in one embodiment of the holding means the disc is conveniently held on one face 19 of the holder by means of fastening members 21.

The laser assembly generally is operated as an amplifier rather than an oscillator. When operated as an amplifier there is employed a source of monochromatic light such as a laser beam indicated by the arrow 23. After the disc and the assembly are pumped by the flash lamps to cause an energy inversion, the monochromatic light beam 23 is passed through each of the discs to cause stimulated emission.

The glass laser disc with its outstanding annular alkali lead borate glass coating can be prepared by methods well known in the art by applying and fusing to the outer periphery of the disc an easily processable and formable glass composition having an effective energy absorbing amount of a heavy metal oxide, preferably $Sm_2O_3$, FeO or CuO, for absorbing energy at a wavelength of 1.06 microns. At the same time, thermal properties of the coating and the disc are matched so that undesirable strains are not developed in the disc and the index of refraction of the resultant glass coating is sufficiently matched with the index of refraction of the glass disc that the index of refraction of the coating is only about 3 to 12 percent greater than the index of refraction of the disc by the use of a mixture of alkali metal oxides in an effective index of refraction matching amount (generally about 1 to 20 percent by weight) in which a mixture of at least two and preferably three alkali metal oxides are used and in which any $K_2O$ present is limited to an amount of preferably not more than about 0.7 – 0.8 percent by weight.

Suitable alkali metal oxides are the oxides of lithium, sodium, potassium, rubidium, and cesium. The preferred alkali metal oxide is sodium and it is usually preferred that the sodium be used in combination with lithium, although good results are obtained with a mixture of $Na_2O$ and $K_2O$. When three alkali metal oxides are used, a preferred combination is that of $na_2O$, $Li_2O$ and $K_2O$. Generally, as previously indicated, the total amount of alkali metal oxide can be about 1 to 20 percent although the maximum amount is preferably below 15 percent by weight. Better results are obtained generally with no more than about 10 percent by weight and optimum results usually are obtained with about 2 to 7 percent by weight of the alkali metal oxide mixture. In general, the $Na_2O$ is usually the principal alkali metal oxide of the alkali mixture and normally it is present in an amount of about 35 to 80 percent by weight of the alkali metal oxide mixture. One preferred combination is the use of $Li_2O$ in an amount of about 20 to 40 percent by weight of the alkali mixture with the principal amount being $Na_2O$. The amount of $K_2O$ is generally relatively low, and generally no more than about 25 percent by weight of the alkali metal oxide mixture and no more than about 1 percent by weight of the total glass composition and preferably no more than about 0.8 percent by weight of the total glass composition. A very specific combination that has been found to be outstanding, for instance, is one in which $Li_2O$ is present in an amount of about 1.4 percent by weight, $Na_2O$ is present in an amount of about 3 percent by weight and $K_2O$ is present in an amount of about 0.6 percent by weight.

Suitable heavy metal oxides for use in the energyabsorbing coatings include oxides of the transition metals of the 3d, 4d, 4f, 5d and 5f orbital series. Such suitable energyabsorbing oxides are $MnO_2$, $Co_2O_3$, $Cr_2O_3$, $Fe_2O_3$, $V_2O_5$, CuO, NiO, $MoO_3$, $WO_3$ and $Sm_2O_3$. Also suitable are oxides of Dy, Tm, Tb and U. The oxides are those of transition metals, broadly having an atomic number between 23 and 92 that absorb at 1.06 microns and specifically those having an atomic number between 23 – 29 (V, Cr, Mn, Fe, Co and Cu) or 42 (Mo) or 62 (Sm) or 66 (Dy) or 69 (Tm) or 70 (Yb) or 74 (W) or 92 (U). It is understood that the oxides listed above are usually present in the batch in the form as set forth above but that the oxides are usually present in two or more forms in the glass. For instance, it is understood that manganese oxide in the glasses is reported as $MnO_2$, but that the oxide is usually present both as $MnO_2$ and $Mn_2O_3$ with the $MnO_2$ probably being the major portion and the $Mn_2O_3$ being the active energy-absorbing portion of the manganese oxide. Likewise, it is understood that, in the case of the other heavy metal oxides, the particular oxide probably is present in two or more forms. In the case of tungsten oxide, it is reported $WO_3$, although it is usually present both as $WO_3$ and $W_2O_5$ with $WO_3$ probably being the major portion. Cobalt oxide is reported as $Co_3O_4$, although it might be present as a mixture of $CoO$ and $Co_2O_3$ in which $CoO$ is probably the major portion. Chromium oxide is reported as $Cr_2O_3$, but it is usually present both as $Cr_2O_3$ and $CrO_3$ with $Cr_2O_3$ probably being the major portion. Iron oxide is reported as $Fe_3O_4$, although it is present as a mixture of $FeO$ and $Fe_2O_3$ with the $Fe_2O_3$ probably being the major portion. Vanadium oxide is reported as $V_2O_5$, although it is usually present as a mixture of $V_2O_5$ and $V_2O_3$ with $V_2O_5$ probably being the major portion. Copper oxide is reported as $CuO$, although the oxide is usually present as $CuO$ and $Cu_2O$ with $CuO$ probably being the major portion. Nickel oxide is reported as $NiO$, but is is understood that the oxide is present both as $NiO$ and $Ni_2O_3$, with $NiO$ probably being the major portion.

In General, the heavy metal oxides are present in an amount of about 1 to 10 percent by weight and preferably 2 to 7 percent by weight. Although $Co_3O_4$ is preferably used in amounts of 1 percent or more by weight, it can be used in amounts as low as 0.01 percent by weight. In general, the sum of the heavy metal oxides in the annular glass coating should not be substantially greater than about 15 percent by weight and preferably should not be substantially greater than about 10 percent by weight.

When a mixture of $Co_3O_4$ and $MnO_2$ is used, $Co_3O_4$ is generally present in an amount of about 5 to 6 percent by weight, and $MnO_2$ is present in an amount of about 2 to 3 percent by weight.

Suitable, preferred and optimum glass coatings utilizing $Sm_2O_3$ as the energy-absorbing oxide have the following approximate composition, it being understood that the oxides listed are present in the batch:

| Ingredient | General % by Wt. | Preferred % by Wt. | Optimum % by Wt. |
|---|---|---|---|
| $SiO_2$ | 0 – 15 | 0 – 13 | 11.9 |
| $ZnO$ | 0 – 28 | 0 – 15 | 7.6 |
| $PbO$ | 15 – 59 | 30 – 50 | 49.2 |
| $B_2O_3$ | 6.8 – 39 | 10 – 25 | 18.4 |
| $Al_2O_3$ | 0 – 8.3 | 2 – 5 | 3.6 |
| $Li_2O$ | 0 – 10 | 0 – 8 | 1.4 |
| $Na_2O$ | 0 – 14 | 0 – 8 | 3 |
| $K_2O$ | 0 – 1 | 0 – 0.8 | 0.6 |
| $Rb_2O$ | 0 – 5.2 | 0 – 2 | |
| $Cs_2O$ | 0 – 4.8 | 0 – 2 | |
| $MgO$ | 0 – 2.8 | 0 – 2 | |
| $CaO$ | 0 – 3.6 | 0 – 2 | 0.8 |
| $BaO$ | 0 – 6.8 | 0 – 4 | 2.1 |
| $F_2$ | 0 – 1.2 | 0.1 – 1 | 0.3 |
| $La_2O_3$ | 0 – 5.1 | 0 – 3 | |
| $Bi_2O_3$ | 0 – 7.7 | 0 – 3 | |
| $P_2O_5$ | 0 – 6.9 | 0 – 2 | |
| $MoO_3$ | 0 – 6.77 | 0 – 4 | |
| $WO_3$ | 0 – 15 | 0 – 8 | |
| $MnO_2$ | 0 – 7.7 | 0 – 2 | 2.27 |
| $Co_3O_4$ | 0 – 7.7 | 0 – 4 | 5.45 |
| $Cr_2O_3$ | 0 – 7.1 | 0 – 1.5 | |
| $Fe_3O_4$ | 0 – 3.4 | 0 – 3 | |
| $V_2O_5$ | 0 – 25 | 0 – 5 | |
| $CuO$ | 0 – 7.9 | 0 – 5 | |
| $Sm_2O_3$ | 0 – 10 | 0 – 7 | |
| $NiO$ | 0 – 5 | 0 – 5 | |

In the general range of ingredients as above set forth, the mixture of alkali metal oxides including $Na_2O$, $Li_2O$, $K_2O$, $Rb_2O$, and $Cs_2O$ should be present in an amount of about 1 to 20 percent by weight, and the sum of the heavy metal oxides, including $MoO$, $WO_3$, $MnO_2$, $Co_3O_4$, $Cr_2O_3$, $Fe_3O_4$, $V_2O_5$, $NiO$, $Sm_2O_3$ and $CuO$ should be not substantially greater than about 15 percent by weight.

In the preferred ranges set forth above, the mixture of alkali metal oxides is generally in the range of about 1 – 15 percent by weight, and the total heavy metal oxide content is about 1 – 10 percent by weight, although best results are obtained when the heavy metal oxide content is between about 2 – 7 percent by weight.

The alkali lead borate glass coatings provide an easily processable low melting glass composition for application and fusion to the outer edge of a laser disc as temperatures as low as about 500°C. and preferably below about 470°C., or even as low as 450°C. The properties of the glass disc are not appreciably affected by the application of the annular coating and, at the same time, the index of refraction is closely matched and the thermal properties of the coating and the disc are compatible. At the same time, parasitic oscillation in the disc is prevented by the absorption of energy at a wavelength of about 1.06 microns by the annular alkali lead borate glass coating 8.

The alkali lead borate glasses used for the annular coating conveniently can be formed at a realtively low temperature in the general range of around 450° to 475°C. and, in any event, generally below about 500°C. Preferably, the alkali lead borate glasses are formed and fused to the glass laser disc at a temperature of about 450° to 475°C., at which temperatures the properties of the glass disc are not changed in any undesirable way.

The index of refraction of the alkali lead borate coatings very closely match that of the disc. The index of refraction of the disc is about 1.55 or 1.56. The index of refraction of the coating can be as low as about 1.6, although typically, excellent results are obtained when the index of refraction is about 1.75 or below. As previously indicated, the index of refraction of the coating is only about 3 – 12 percent greater than the index of refraction of the disc, and this close matching is a great advantage, because the less the difference in the index of refraction between the materials at their interface, the greater the efficiency of the laser disc, due to less internal reflection in the disc, etc. For some cases the increase in the index of refraction of the coating can be kept to about 4 to 5 percent or as low as about 3 percent in some particular application. In any event the increase in index of refraction can be kept below about 12 percent and the less the increase the better. It is understood that the index of refraction mentioned above is measured as $n_d$ (measured at the sodium d-line at normal incidence). As indicated, the closer the match, the better the performance of the coated disc, so that coatings generally having an index of refraction of only 3 or 4 to about 6 to 7 percent greater than that of the disc are preferred, especially when the thermal property matching is not substantially deteriorated.

The melting techniques used to melt the glass laser compositions and the low melting alkali lead borate compositions are well known in the art. In general, the melting technique for the low melting alkali lead borate glasses include the melting of the batch compositions in a platinum or other refractory crucible in a furnace that is preferably electrically heated. Generally, the batch compositions are melted at about 2400°F. and thereafter the furnace temperature lowered to around 1700°F. for about 4 hours. The resultant alkali lead borate glass, when thoroughly heated and homogenized, is then quenched by conventional fritting techniques to form glass frit. The resultant glass frit is generally ground dry for around 2 hours in a ball mill using alumina rods to provide a powdered glass that is screened to about a 100 mesh. The powdered glass is prepared for coating for discs by wet milling for about 24 hours. The material has about 100 percent of its particles less than about 12 microns. As is conventional in the art, a binder such as nitrocellulose may be added to the finely ground material and generally the material is applied to the discs, by, for instance, dipping or spraying. Thereafter, the coatings can be conveniently heated to about 450° to 470°C. for about 1 hour. The temperature employed generally must be sufficient to cause the coating glass to melt and flow evenly onto the edges of the laser disc. Thereafter, the disc is cooled at a predetermined rate sufficient so as not to create any undesirable strains in the glass. However, the temperature should not be so high as to cause the material to flow over the edge of the discs onto the face thereof. In general, the time and temperature employed in fusing the coating onto the disc is dependent upon the thickness of the coating and the mass of the disc.

The glass laser disc can be made from the glass laser compositions disclosed in U.S. Pat. Nos. 3,457,182 and 3,471,409. These U.S. patents are hereby incorporated by reference for their disclosure of the preferred glass laser disc compositions. Excellent results are obtained with the glass compositions set forth in the above incorporated U.S. Pat. No. 3,471,409 to Lee and Rapp, which discloses glass laser compositions having the following ingredients in approximate mole percent:

| Ingredient | Mole Percent |
| --- | --- |
| $SiO_2$ | 45 – 75 |
| $Al_2O_3$ | 10 – 8 |
| $Li_2O$ | 15 – 35 |
| CaO | ½ – 30 |
| $Nd_2O_3$ | 1/10 – 2 |

Other glass laser compositions suitable for the preparation of glass discs for the present invention are also disclosed in U.S. Pat. Nos. 3,640,890 and 3,640,891, which are incorporated by reference.

The laser glass compositions can be melted and formed by methods well-known in the art, as for instance, described in U.S. Pat. No. 3,656,924 to Chapman and LeSueur, which is incorporated by reference. As is well-known in the art, the molten laser glass can be conveniently cast into the form of discs for use in the present invention.

The discs that are coated according to the present invention are generally of a size of from about 4 inches to 20 or more inches in diameter when the discs are circular in cross section. The thickness of the disc generally varies from about one-fourth inch to about 2 inches. Generally, the discs are elliptical in form as shown in FIG. 1 and generally the long axis of the ellipse is about 6 to 20 inches and the short axis is about 3 to 10 inches although, as is well known in the art, many sizes and shapes of discs can be employed, particularly in laser assemblies where the discs are used as amplifiers.

The lead borate coatings generally have a thickness ranging as low as about 1 micron to as high as about 1 millimeter (1000 microns) and preferably the coatings are at least 20 to 30 microns in thickness with about 40 to 100 or 120 microns being a preferred range.

The following examples are intended to illustrate the present invention and not to limit the same in any way.

EXAMPLE 1

A circular laser disc such as shown in FIG. 1 was prepared having a diameter of about 2 inches and a thickness about one-fourth inch from a glass laser composition having the following approximate composition:

| Ingredient | Mole Percent |
| --- | --- |
| $SiO_2$ | 60 |
| $Al_2O_3$ | 2.5 |
| $Li_2O$ | 27.5 |
| CaO | 10 |
| $Nd_2O_3$ | 0.5 |
| $CeO_2$ | 0.16 |

The disc was coated with an alkali lead borate glass composition having the following approximate composition:

| Ingredient | Percent by Weight |
| --- | --- |
| $SiO_2$ | 11.9 |
| $Al_2O_3$ | 3.6 |
| $B_2O_3$ | 18.4 |
| $Li_2O$ | 1.4 |
| $Na_2O$ | 3 |
| $K_2O$ | 0.6 |
| CaO | 0.8 |
| ZnO | 7.6 |
| BaO | 2.1 |
| PbO | 49.2 |
| $F_2$ | 0.3 |
| CoO | 5.45 |
| $MnO_2$ | 2.27 |

The glass coating composition was prepared from raw batch materials as is well known in the art and the coating applied to the outer periphery of the disc and fused thereto at a relatively low temperature of about 450° to 470°C. with no damage to the glass disc. The thickness of the alkali lead borate coating containing the energy absorbing heavy metal oxide was about 75 microns (0.003 inches). The resultant disc, when used in a laser assembly as shown in FIG. 3, performed well and excellent results were obtained without excessive damage to the disc from its use. No evidence of damage due to parasitic oscillations was observed.

EXAMPLE 2

A glass laser disc as described in Example 1 which was coated as therein described with an alkali lead borate glass having a raw batch composition approximately as follows:

| Ingredient | Percent By Weight |
| --- | --- |
| $SiO_2$ | 12.03 |
| $Al_2O_3$ | 3.63 |
| $B_2O_3$ | 18.59 |
| $Li_2CO_3$ | 1.46 |
| $Na_2CO_3$ | 3.03 |
| $K_2CO_3$ | 0.62 |
| $CaCO_3$ | 0.88 |
| $ZnO$ | 7.06 |
| $BaCO_3$ | 2.18 |
| $PbO$ | 49.67 |
| $ZnF_2$ | 0.92 |
| $CuO$ | 1.82 |

The above raw batch composition was melted, fritted and coated on the disc as previously described, and excellent results were obtained.

EXAMPLE 3

A 15.5 pound raw batch was weighed, blended and melted as previously described, the batch having the following approximate composition:

| Ingredient | Percent By Weight |
| --- | --- |
| $SiO_2$ | 11.11 |
| $Li_2CO_3$ | 1.35 |
| $Na_2CO_3$ | 2.80 |
| $K_2CO_3$ | 0.57 |
| $ZnO$ | 6.59 |
| $ZnF_2$ | 0.85 |
| $BaO$ | 2.02 |
| $CaO$ | 1.74 |
| $PbO$ | 48.83 |
| $B_2O_3$ | 17.16 |
| $Al_2O_3$ | 3.35 |
| $Co_2O_3$ | 5.45 |
| $MnO_2$ | 2.27 |

The raw batch was melted in an electric furnace for 4 hours at 2,400°F., after which time the molten glass was poured through a set of water-cooled rollers and formed into flakes to yield approximately 12 pounds, 4 ounces of flakes or chips. Ten pounds of the chips were charged into a 3.4 gallon rod mill to provide, after 2½-hour period, a yield of about 9 pounds, 3 ounces of a ground product that was less than 100 mesh in particle size. The ground material was processed by a second grind for 24 hours, to provide a wet ground material suitable for preparing a slurry for application to the glass disc by spraying, using conventional spray equipment. The coating was fired onto the outer periphery of the glass disc by slowly heating the disc to about the annealing point thereof, which was approximately 470°C. and holding that temperature for several hours. Thereafter, the disc and annular coating thereon were cooled at a very slow rate to substantially below the strain point of the disc, which as about 432°C and thereafter the product cooled in the furnace at a normal furnace rate. Physical properties of the glass coating were determined as follows:

Fiber softening point —473°C.
Annealing point —380°C.
Strain point —359°C.
Refractive Index —1.74 – 1.75

The resultant alkali lead borate coatings on the glass were dark in color and appeared opaque in visible light. Glass discs with the alkali lead borate annular coatings were tested and found to be entirely satisfactory in eliminating the parasitic oscillations.

In the above examples, other alkali lead borate glass compositions disclosed herein as being useful and containing the heavy metal oxides as energy absorbers disclosed herein and the novel mixture of alkali metal oxides disclosed herein can be used in place of the particular alkali lead borate glass coating compositions to provide substantially equivalent results.

The present invention is an improvement in the glass disc having an annular lead borate glass coating for use in a laser assembly as disclosed and claimed in the co-pending U.S. patent application Ser. No. 331,754 filed Feb. 13,1973, for an invention of Louis Spanoudis, entitled "Laser Assembly Using Glass Discs with Lead Borate Coatings", filed concurrently herewith and assigned to the same assignee as the present invention. The present invention is particularly useful in applications where a very close match of the index of refraction between the glass coating and disc is desired. As previously stated, the index of refraction of the alkali lead borate coatings described herein have an index of refraction no more than only about 12 percent greater than the index of refraction of the disc, wherein the index of refraction of the lead borate coatings disclosed in the above-identified Spanoudis application, generally have an index of refraction in the neighborhood of about 1.8 to 1.9. When these lead borate coatings are used on a disc having an index of refraction of about 1.55, the index of refraction of the coating is considerably higher than 12 percent compared to the index of refraction of the disc.

What is claimed is:

1. A glass laser disc having an annular alkali lead borate glass coating capable of absorbing energy at a wave length of 1.06 microns to thereby absorb parasitic oscillations, the glass coating having an index of refraction not more than about 12 percent greater than the index of refraction of the disc, the thermal expansion and contraction of the coating being matched with the disc so that undesirable strains therein are not developed in the disc; the glass coating comprising:
   1. a mixture of alkali metal oxides in which at least two different alkali metal oxides are present, and any $K_2O$ that is present is limited to an amount of not substantially more than about 1 percent by weight; and
   2. an effective energy-absorbing amount of a heavy metal oxide that absorbs energy at a wave length of about 1.06 microns.

2. A disc as defined in claim 1 in which the mixture of alkali metal oxides includes $Na_2O$.

3. A disc as defined in claim 1 in which the mixture of alkali metal oxides comprises $Na_2O$ and $Li_2O$.

4. A disc as defined in claim 1 in which the mixture of alkali metal oxides comprises $Na_2O$ and $K_2O$.

5. A disc as defined in claim 1 in which the mixture of alkali metal oxides is $Na_2O$, $Li_2O$ and $K_2O$.

6. A disc as defined in claim 1 in which the heavy metal oxide is $Sm_2O_3$.

7. A disc as defined in claim 1 in which the heavy metal oxide is $CuO$.

8. A disc as defined in claim 1 in which the heavy metal oxide is $CoO$.

9. A disc as defined in claim 1 in which the heavy metal oxide is $FeO$.

10. A disc as defined in claim 1 in which the glass coating has the following approximate composition:

| Ingredient | Percent by Weight |
|---|---|
| SiO$_2$ | 0 – 15 |
| Al$_2$O$_3$ | 0 – 8.3 |
| B$_2$O$_3$ | 6.8 – 39 |
| Li$_2$O | 0 – 10 |
| Na$_2$O | 0 – 14 |
| K$_2$O | 0 – 1 |
| Rb$_2$O | 0 – 5.2 |
| Cs$_2$O | 0 – 4.8 |
| MgO | 0 – 2.8 |
| CaO | 0 – 3.6 |
| ZnO | 0 – 28 |
| BaO | 0 – 6.8 |
| PbO | 15 – 59 |
| F$_2$ | 0 – 1.2 |
| La$_2$O$_3$ | 0 – 5.1 |
| Bi$_2$O$_3$ | 0 – 7.7 |
| P$_2$O$_5$ | 0 – 6.9 |
| MoO$_3$ | 0 – 6.77 |
| WO$_3$ | 0 – 15 |
| MnO$_2$ | 0 – 7.7 |
| Co$_3$O$_4$ | 0 – 7.7 |
| Cr$_2$O$_3$ | 0 – 7.1 |
| Fe$_3$O$_4$ | 0 – 3.4 |
| V$_2$O$_5$ | 0 – 25 |
| NiO | 0 – 5 |
| CuO | 0 – 7.9 |
| Sm$_2$O$_3$ | 0 – 10 | the sum of MnO$_2$, Co$_3$O$_4$, Cr$_2$O$_3$, Fe$_3$O$_4$, V$_2$O$_5$, NiO, Sm$_2$O$_3$ and CuO being not substantially greater than about 15 percent by weight, and the sum of Li$_2$O, Na$_2$O, K$_2$O, Rb$_2$O and Cs$_2$O being about 1 to 20 percent by weight.

11. A disc as defined in claim 1 in which the glass coating has the following approximate composition:

| Ingredient | Percent by Weight |
|---|---|
| SiO$_2$ | 0 – 13 |
| ZnO | 0 – 15 |
| PbO | 30 – 50 |
| B$_2$O$_3$ | 10 – 25 |
| Al$_2$O$_3$ | 2 – 5 |
| Li$_2$O | 0 – 8 |
| Na$_2$O | 0 – 8 |
| K$_2$O | 0 – 0.8 |
| Rb$_2$O | 0 – 2 |
| Cs$_2$O | 0 – 2 |
| MgO | 0 – 2 |
| CaO | 0 – 2 |
| BaO | 0 – 4 |
| F$_2$ | 0.1 – 1 |
| La$_2$O$_3$ | 0 – 3 |
| Bi$_2$O$_3$ | 0 – 3 |
| P$_2$O$_5$ | 0 – 2 |
| MoO$_3$ | 0 – 4 |
| WO$_3$ | 0 – 8 |
| MnO$_2$ | 0 – 2 |
| Co$_3$O$_4$ | 0 – 4 |
| Cr$_2$O$_3$ | 0 – 1.5 |
| Fe$_3$O$_4$ | 0 – 3 |
| V$_2$O$_5$ | 0 – 5 |
| CuO | 0 – 5 |
| Sm$_2$O$_3$ | 0 – 7 |
| NiO | 0 – 5 | where the mixture of alkali metal oxides is about 1 to 20 percent by weight, and where the sum of MoO$_3$, WO$_3$, MnO$_2$, Co$_3$O$_4$, Cr$_2$O$_3$, Fe$_3$O$_4$, V$_2$O$_5$, NiO, Sm$_2$O$_3$ and CuO is not substantially greater than about 15 percent by weight.

12. A disc as defined in claim 1 in which the glass coating has the following approximate composition:

| Ingredient | Percent by Weight |
|---|---|
| SiO$_2$ | 11.9 |
| Al$_2$O$_3$ | 3.6 |

-Continued

| Ingredient | Percent by Weight |
|---|---|
| B$_2$O$_3$ | 18.4 |
| Li$_2$O | 1.4 |
| Na$_2$O | 3 |
| K$_2$O | 0.6 |
| CaO | 0.8 |
| ZnO | 7 |
| BaO | 2.1 |
| PbO | 49.2 |
| F$_2$ | 0.9 |
| CoO | 5.45 |
| MnO$_2$ | 2.27. |

13. A disc as defined in claim 1 in which the glass coating contains at least 8 metal oxide ingredients.

14. A disc as defined in claim 1 in which the glass coating contains at least 10 metal oxide ingredients.

15. A disc as defined in claim 1 in which the heavy metal oxide is an oxide of a transition metal having an atomic number between 23 and 29.

16. A disc as defined in claim 15 in which the transition metal is vanadium.

17. A glass laser disc having an annular alkali lead borate glass coating for absorbing energy at a wave length of about 1.06 microns to thereby absorb parasitic oscillations, the glass coating having an index of refraction not more than about 12 percent greater than the index of refraction of the disc, the coating and the disc being so constructed and arranged that the development of undesirable strains in the disc is prevented; the glass coating comprising:

1. a mixture of alkali metal oxides in which at least two different alkali metal oxides are present; and
2. an effective energy-absorbing amount of a heavy metal oxide that absorbs energy at a wave length of about 1.06 microns.

* * * * *